(12) United States Patent
Mauldin et al.

(10) Patent No.: US 7,067,613 B2
(45) Date of Patent: Jun. 27, 2006

(54) SEPARATION OF POLYOLEFINS FROM NYLONS

(75) Inventors: Lloyd Ballard Mauldin, Cartersville, GA (US); Jerry Allen Cook, Cartersville, GA (US)

(73) Assignee: Chemical Products Corporation, Cartersville, GA (US)

( * ) Notice: Subject to any disclaimer, the term of this patent is extended or adjusted under 35 U.S.C. 154(b) by 0 days.

(21) Appl. No.: 10/708,693

(22) Filed: Jun. 4, 2004

(65) Prior Publication Data

US 2005/0272913 A1 Dec. 8, 2005

(51) Int. Cl.
*C08F 6/00* (2006.01)
(52) U.S. Cl. .................. 528/480; 156/72.94; 428/95; 428/99; 528/271; 528/272; 528/310
(58) Field of Classification Search .............. 156/72, 156/94; 428/95, 99; 528/480
See application file for complete search history.

(56) References Cited

U.S. PATENT DOCUMENTS

| | | | |
|---|---|---|---|
| 2,639,278 A | 5/1953 | Stott et al. |
| 2,958,677 A | 11/1960 | Kleinschmidt |
| 3,006,867 A | 10/1961 | Simon |
| 3,696,058 A | 10/1972 | Teti |
| 4,003,880 A | 1/1977 | Sidebotham et al. |
| 4,003,881 A | 1/1977 | Sidebotham et al. |
| 4,064,079 A | 12/1977 | Sidebotham et al. |
| 4,079,001 A | 3/1978 | Haase et al. |
| 4,110,071 A | 8/1978 | Schaub et al. |
| 4,118,187 A | 10/1978 | Sidebotham et al. |
| 4,137,393 A | 1/1979 | Sidebotham et al. |
| 4,146,704 A | 3/1979 | Seki et al. |
| 4,165,288 A | 8/1979 | Teed et al. |
| 4,207,184 A | 6/1980 | Kaiser et al. |
| 4,404,104 A | 9/1983 | Wurster et al. |
| 4,416,936 A | 11/1983 | Erickson et al. |
| 4,546,128 A | 10/1985 | Nakajima |
| 4,581,144 A | 4/1986 | Marchesi |
| 4,613,664 A | 9/1986 | Tate et al. |
| 4,809,397 A | 3/1989 | Jacobs et al. |
| 4,880,510 A | 11/1989 | Uhrich |
| 5,198,471 A | 3/1993 | Nauman et al. |
| 5,236,959 A | 8/1993 | Oakley et al. |
| 5,240,530 A | 8/1993 | Fink |
| 5,241,066 A | 8/1993 | Davis et al. |
| 5,246,467 A | 9/1993 | Cockett et al. |
| 5,278,282 A | 1/1994 | Nauman et al. |
| 5,280,105 A | 1/1994 | Moran, Jr. |
| 5,288,349 A | 2/1994 | Fink |
| 5,294,384 A | 3/1994 | David et al. |
| 5,342,854 A | 8/1994 | Serad |
| 5,360,551 A | 11/1994 | Weber |
| 5,430,068 A | 7/1995 | Subramanian |
| 5,453,202 A | 9/1995 | Marchesi |
| 5,456,872 A | 10/1995 | Ahrweiler |
| 5,462,233 A | 10/1995 | Isao et al. |
| 5,472,763 A | 12/1995 | Schwarz et al. |
| 5,481,786 A | 1/1996 | Smith et al. |
| 5,516,050 A | 5/1996 | Yamamoto et al. |
| 5,518,188 A | 5/1996 | Sharer |
| 5,532,035 A | 7/1996 | Corbin et al. |
| 5,538,776 A | 7/1996 | Corbin et al. |
| 5,556,684 A | 9/1996 | Forero |
| 5,565,158 A | 10/1996 | Sullivan et al. |
| 5,578,357 A | 11/1996 | Fink |
| 5,591,802 A | 1/1997 | David et al. |
| 5,598,980 A | 2/1997 | Dilly-Louis et al. |
| 5,604,009 A | 2/1997 | Long et al. |
| 5,626,939 A | 5/1997 | Kotlair et al. |
| 5,630,896 A | 5/1997 | Corbin et al. |
| 5,639,379 A | 6/1997 | Stogner, Jr. |
| 5,665,784 A | 9/1997 | Moore et al. |
| 5,704,104 A | 1/1998 | Bacon et al. |
| 5,728,444 A | 3/1998 | Fink |
| 5,769,335 A | 6/1998 | Shutov |
| 5,780,520 A | 7/1998 | Reeves et al. |
| 5,786,280 A | 7/1998 | Funger et al. |

(Continued)

FOREIGN PATENT DOCUMENTS

CS 143502 11/1971

(Continued)

OTHER PUBLICATIONS

Abdel-Gawad AS Emara, Abdel-Fattah AA, Ebraheem SE. (2001) The Destructive Degradation of Some Organic Textile Dye Compounds Using Gamma Ray Irradiation. In: Use of Irradiation for Chemical and Microbial Decontamination of Water, Wastwater and Sludge. Final Report of a Co-ordinated Research Project, pp. 97-119.
Block DR. Solvents and Non Solvents for Polymers. In: Polymer Handbook, Eds. Bandrup, J. Immergut, EH, Grulke, EA, 4th Edition, John Wiley, New York, pp. 497-545, 1999.

(Continued)

*Primary Examiner*—Terressa Boykin
(74) *Attorney, Agent, or Firm*—Thomas, Kayden, Horstemeyer & Risley LLP; Todd Deveau

(57) ABSTRACT

In the recycling of Nylon 6 and Nylon 6,6 polyamides from post-consumer or post-industrial waste, a process is disclosed to separate Nylon 6 and Nylon 6,6 polyamides from commingled polyolefin waste components, particularly polypropylene, by admixing the waste with an ester solvent composition and heating the admixture to a temperature above the melting temperature of the contained polyolefins to form an ester solvent composition further containing dissolved polyamide polymer and a separate immiscible liquid polyolefin phase. The ester solvent composition preferably contains ethylene carbonate, propylene carbonate, butylene carbonate, or mixtures thereof.

40 Claims, No Drawings

U.S. PATENT DOCUMENTS

| | | | |
|---|---|---|---|
| 5,792,336 | A | 8/1998 | Nikolaevsky et al. |
| 5,824,709 | A | 10/1998 | Suka |
| 5,829,690 | A | 11/1998 | Deschamps |
| 5,840,773 | A | 11/1998 | Booij et al. |
| 5,849,804 | A | 12/1998 | Sarian et al. |
| 5,859,071 | A | 1/1999 | Young et al. |
| 5,889,142 | A * | 3/1999 | Mohajer et al. ............ 528/480 |
| 5,897,066 | A | 4/1999 | Bacon et al. |
| 5,898,063 | A | 4/1999 | Stefandl |
| 5,908,164 | A | 6/1999 | Robinson et al. |
| 5,912,062 | A | 6/1999 | Kotliar et al. |
| 5,914,353 | A | 6/1999 | Grizzle et al. |
| 5,919,717 | A | 7/1999 | Wallick |
| 5,952,660 | A | 9/1999 | Kip et al. |
| 5,989,296 | A | 11/1999 | Patton et al. |
| 5,994,417 | A | 11/1999 | Roberts et al. |
| 6,036,726 | A | 3/2000 | Yang et al. |
| 6,037,282 | A | 3/2000 | Milding et al. |
| 6,051,300 | A | 4/2000 | Fink |
| 6,059,207 | A | 5/2000 | Costello et al. |
| 6,061,876 | A | 5/2000 | Rowe |
| 6,083,283 | A | 7/2000 | Berkstresser, IV et al. |
| 6,126,096 | A | 10/2000 | Robinson et al. |
| 6,140,463 | A | 10/2000 | Stefandl |
| 6,155,020 | A | 12/2000 | Deem |
| 6,155,429 | A | 12/2000 | Clark |
| 6,180,192 | B1 | 1/2001 | Smith et al. |
| 6,211,275 | B1 | 4/2001 | Xanthos et al. |
| 6,213,557 | B1 | 4/2001 | Aebischer et al. |
| 6,291,048 | B1 | 9/2001 | Jerdee et al. |
| 6,299,961 | B1 | 10/2001 | Pelzer |
| 6,306,303 | B1 | 10/2001 | Goebel et al. |
| 6,398,891 | B1 | 6/2002 | Corbin et al. |
| 6,503,595 | B1 | 1/2003 | Kim et al. |
| 6,552,123 | B1 * | 4/2003 | Katayama et al. ............ 525/57 |
| 6,610,769 | B1 | 8/2003 | Blanpain et al. |
| 2001/0051248 | A1 | 12/2001 | Jerdee et al. |
| 2002/0184816 | A1 | 12/2002 | Philipson |
| 2003/0075824 | A1 | 4/2003 | Moore, Jr. et al. |
| 2004/0001934 | A1 | 1/2004 | Young |
| 2004/0048035 | A1 | 3/2004 | Bailey et al. |
| 2004/0055951 | A1 | 3/2004 | Shiotani et al. |
| 2004/0086682 | A1 | 5/2004 | Rice et al. |

FOREIGN PATENT DOCUMENTS

| | | |
|---|---|---|
| DE | 43 43 784 | 7/1994 |
| EP | 0 603 434 | 6/1994 |
| EP | 0 759 456 | 2/1997 |
| JP | 2000-044724 | 2/2000 |
| WO | WO 98/06778 | 2/1998 |
| WO | WO 98/35077 | 8/1998 |
| WO | WO 98/35998 | 8/1998 |
| WO | WO 99/40250 | 8/1999 |
| WO | WO 00/27245 | 5/2000 |
| WO | WO 00/27916 | 5/2000 |
| WO | WO 00/29463 | 5/2000 |
| WO | WO 01/45942 | 6/2001 |
| WO | WO 01/76869 | 10/2001 |
| WO | WO 02/01989 | 1/2002 |
| WO | WO 02/02310 | 1/2002 |
| WO | WO 02/02864 | 1/2002 |
| WO | WO 02/11589 | 2/2002 |

OTHER PUBLICATIONS

Calabro V, Pantano G, et al. Experimental Study on Integrated Membrane Processes in the Treatment of Solutions simulating Textile Effluents. Energy and Exergy Analysis. In: Desalination. 78:257-277, 1990.

Dávila-Jimé nez MM, Elizalde-González, et al. Electrochemical treatment textile dyes and their analysis by high-performance liquid chromatography with diode array detection. In: Journal of Chromatography. A, 889:253-259, 2000.

Dessouki AM, Abdel-Aal SE, et al. Use of Polymeric and Natural Materials for the Removal of Irradiated Direct and Acid Dyes form Effluents. Seventh Conference of Nuclear Sciences & Applications 6-10 Feb. 2000, Cairo, Egypt.

Gültekin I. and Ince NH. Kinetics of Textile Dye Degradation by $UV/H_2O_2$ Process. International conference on oxidation technologies for water and wastewater treatment, with technical exhibitions, May 18-22, 2003, Goslar, Germany.

Kos, L, Perkowski J. Decoluration of Real Textile Wastewater with Advanced Oxidation Processes. In: Fibres & Textiles in Eastern Europe. 11(4(43)):81-85, 2003.

Mihut C, Captain DK, et al. Review: Recycling of Nylon From Carpet Waste. In: Polymer Engineering and Science. 41(9):1457, 2001.

Muegge, J and Yernaux JM. Recovery of Plastics Using Solvents. In: Plastics in End of Life Vehicles. pp. 1-4, 2002.

Öğütveren ÜB and Koparal S. Color Removal From Textile Effluents by Electrochemical Destruction. In: J. Envoron. Sci. Health. A29(1):1-16, 1994.

Pelegrini R, Peralta-Zamora P, et al. Electrochemically Assisted Photocatalytic Degradation of Reactive Dyes. In: Applied Catalysis B: Environmental. 22:83-90, 1999.

Perkowski J, Kos L, et al. Decomposition of Anthraquinone Dye Acid Blue 62 by the Decoloration of Textile Wastewater by Advance Oxidation Process. In: Fibres & Textiles in Eastern Europe. 2(41):88-94, 2003.

Prevot AB, Basso A, et al. Analytical Control of Photocatalytic Treatments: Degradation of a Sulfonated Azo Dye. In: Anal. Bioanal. Chem. 378:214-220, 2003.

Solpan D and Güven. Decoloration and Degradation of Some Textile Dyes by Gamma Irradiation. In: Radiation Physics and Chemistry. 65:549-558, 2002.

Starkweather HW and Jones GA. Crystalline Transitions in Powders of Nylon 66 Crystallized from Solution. In: Journal of Polymer Science: Polymer Physics Ed. 19:467-477, 1981.

Xu Y. Comparative Studies of the $Fe^{3+/2+}$-UV, $H_2O_2$-UV, $TiO_2$-UV/vis Systems for the Decolorization of a Textile Dye X-3B in Water. In: Chemosphere 43:1103-1107, 2001.

Nylon 6,6 Specific Heat and Heat of Melting. In: Manufacturing Engineer's Reference Book, 1993.

* cited by examiner

SEPARATION OF POLYOLEFINS FROM NYLONS

BACKGROUND OF INVENTION

Billions of pounds of post-consumer carpet waste are generated each year in the United States. Landfilling is not an environmentally friendly solution since carpet fibers, like many other synthetic polymers, are not biodegradable. Furthermore, the cost of disposal is increasing due to efforts to make landfills more environmentally secure and to preserve limited capacity. Environmental concerns and governmental regulations have spurred efforts to recycle as much of the non-biodegradable synthetic polymer waste stream as practicable.

In a post-consumer carpet waste there are generally three predominant components: backing fiber, face fiber, and non-fibrous backing materials. Polypropylene is present in the primary and secondary backing of most carpets, generally in the form of woven ribbons or nonwoven fabric. In addition, polypropylene fiber is sometimes found as the face fiber. The most common face fibers are the polyamides, Nylon 6 and Nylon 6,6. Backing compositions generally contain binders such as SBR latex and fillers such as calcium carbonate. Commercial carpet may employ mixed polyolefin, polyvinyl chloride, or polyurethane non-fibrous backing components.

The fiber component of the overall post-consumer carpet waste stream would be expected to consist of approximately 40% Nylon 6; 40% Nylon 6,6; and 10% Polypropylene. Sorting carpet pieces according to face fiber type before the pieces are shredded, further size-reduced, and separated into a fibrous component and a non-fibrous binder and dirt component, can yield segregated commingled fiber wastes composed of about 80% Nylon 6 or Nylon 6,6 and about 5% to 10% Polypropylene. This amount of Polypropylene polymer in Polyamide degrades the physical properties of the Polyamide polymer to such an extent that it is unsuitable for virtually all typical Nylon 6 or Nylon 6,6 applications. Thus, the utility of Nylon 6 and Nylon 6,6 polymers recovered from waste is, to a great extent, dependent upon the absence of polyolefin polymer contaminants.

U.S. Pat. Nos. 5,240,530 and 5,288,349 (Fink) teach a carpet recycling and recovery method in which portions of the carpet are initially ground and physically separated before being remelted for a feedstock. Carpets containing different types of polymers are ground mechanically to reduce fiber length to less than ±4 inch, then fibers of polypropylene, polyester, and polyamide are claimed to be separated on the basis of specific gravity when suspended in water. No specific extraction steps are disclosed.

U.S. Pat. No. 6,155,429 (Clark) teaches that enhanced separation of light and heavy particles from an aqueous suspension in a hydrocyclone by injection of air into the slurry upstream of the hydrocyclone is useful in the recycling of Nylon face fiber from post-consumer carpets. The carpets must be converted to a form that can be slurried and processed in a hydrocyclone after first being sorted by face fiber type. Carpets of like polymer face fiber (Nylon 6,6 or Nylon 6) are size-reduced by suitable means, such as with a hammermill, to pieces suitable for further size-reduction. After sifting to remove filled binder and loose dirt, the remaining fibrous product is further size-reduced, such as with a cutter, to reduce the fibrous material to a particle size such that it passes through a screen with holes less than or equal to about 0.125 inches (0.32 cm) and then admixed with water. The specific gravity of nylon is generally about 1.2 which is greater than the specific gravity of water (1.0) which is greater than the specific gravity of polypropylene (0.9). The apparent specific gravity of these materials is stated to be dependent upon the crystallinity and processing of said materials, so separation efficiency would be expected to be variable.

Solvents such as octane have been proposed to dissolve Polypropylene bonded to Polyamide fibers without altering the Polyamide fibers. The Polypropylene is separated from the solvent by cooling with subsequent filtration (Tselishcheva et al.; International Polymer Science and Technology; 29, No. 8, p.T/55–6; 2002). This process would appear to be unsuitable for a waste containing a substantial proportion of Polyamide because of the difficulty of effectively removing Polypropylene-laden solvent from a substantial mass of Polyamide fibers.

U.S. Pat. Nos. 5,198,471 and 5,278,282 (Nauman) teach selective dissolution of individual polymers from a mixed polymer waste stream. Polymers are dissolved in a solvent at progressively higher temperatures with multiple extractions of solvent solution so that individual pure polymers can be precipitated from solution. Each polymer is dissolved at a temperature near, but not exceeding, the melting temperature of the polymer. Thus, the polyolefins would be dissolved prior to dissolution of either Nylon 6 or Nylon 6,6 which have higher melting temperatures than polypropylene or the other polyolefins. Once again, this process would appear to be unsuitable for a waste containing a substantial proportion of Polyamide fibers because of the difficulty of effectively removing Polypropylene-laden solvent from a substantial mass of Polyamide fibers.

U.S. Pat. No. 5,430,068 (Subramanian) teaches a process for recovering polyamide from admixtures with foreign materials by dissolving the polyamide, at an elevated temperature substantially below the melting temperature of Polypropylene, in a solvent selected from the group consisting of a substantially anhydrous ethylene glycol, propylene glycol, and aliphatic carboxylic acid having from 2 to 6 carbon atoms, filtering, then combining the polyamide solution with an additional quantity of substantially the same solvent at a lower temperature to cause the polyamide to precipitate. The named solvents may react with components of the carpet backing such as calcium carbonate. Rapid cooling by addition of substantial quantities of cool solvent is necessitated by degradation of polyamide when held in the hot solvent.

U.S. Pat. No. 5,898,063 (Stefandl) teaches a recycling and recovery process for waste carpet employing a solvent such as ethylene glycol, propylene glycol, glycerol and various mixtures of these solvents, or, alternatively, an organic formate, hydrochloric acid, formic acid, methanol, nitric acid, glacial acetic acid, fluorinated alcohols, m-cresol, phenolic compounds, chloroform-methanol, methanol-lithium chloride, potassium thiocyanate, benzyl alcohol, butane diol 1,1, dimethyl sulfoxide, triethylene glycol, or tetraethylene glycol. Nylon 6 and Nylon 6,6 are taught to be soluble in each of these solvents at various elevated temperatures. Once again, these solvents may react with components of the waste carpet backing present with the Nylon 6 and Nylon 6,6 or degrade the dissolved polyamide polymer, additionally, most present environmental, and worker health and safety hazards. U.S. Pat. No. 6,140,463 (Stefandl) teaches recovery of a purer Nylon polymer from carpet by dissolving and precipitating the Nylon polymer at least twice utilizing the same solvents described in U.S. Pat. No. 5,898,063 (Stefandl).

U.S. Pat. No. 5,908,164 teaches a process for the physical separation and recovery of fractional components of used carpet involving pre-cutting and preferably pre-soaking of the used carpet into appropriate sized pieces followed by the introduction of the pre-conditioned used carpet pieces into a cyclonic comminuter which reduces the carpet pieces into fractional components.

U.S. Pat. No. 6,126,096 teaches a process for physical separation of the components of waste carpet including soaking and chilling appropriately sized carpet pieces to or below freezing to stiffen the backing material and enhance the comminution process, then collecting the components from the respective discharges from the cyclonic comminuter, washing, and separating by carding, static charges, pressure gradients and the like.

U.S. Pat. No. 5,994,417 teaches a process for recovering polymers from commingled materials by selectively dissolving the polymer in a solvent and then contacting the solution with an anti-solvent comprising a compressed fluid, near, at or above its critical pressure into which the solvent is soluble but into which the polymer is insoluble. The anti-solvent is selected from the group consisting of ethane, propane and carbon dioxide.

All of these prior art approaches to the separation of Nylon 6 or Nylon 6,6 polyamide polymers from the polypropylene polymer usually found in the backing of carpets suffer from shortcomings, thus an unmet need exists for an environmentally benign, inexpensive means of purifying polyamide polymer recovered from commingled polyamide and polyolefin wastes.

SUMMARY OF INVENTION

This invention is directed to a process for separating the polyolefin component from the polyamide component of post-consumer or post-industrial waste containing commingled polyamide polymers and polyolefin polymers. This invention is particularly directed to a process for the recovery of polyamide polymer from commingled fibers of Nylon 6 or Nylon 6,6 and Polypropylene.

It is an objective of this invention to provide a means of recycling and purifying polyamide polymer from waste material containing polyolefin polymer commingled with polyamide polymer. The polyamide fiber may be the major synthetic component or it may be present in lesser amounts compared to the polyolefin.

It is a further objective of this invention to provide a means for separating and recovering polyamide polymer components of post-consumer carpet waste, used carpets, carpet scraps and the like, which contain a relatively high proportion of polyamide polymer. Another objective is to provide an economical, practical and environmentally acceptable method for recovery of highly purified polyamide polymer from carpeting materials containing Nylon 6 or Nylon 6,6 face fibers intimately associated with polypropylene fibers and possibly other polyolefin polymers, as well as natural fibers.

A process for separation of polyamide components of commingled waste from polyolefin components is disclosed. Polyamide components are dissolved or suspended in an ester solvent phase at a temperature above the melting temperature of the polyolefin components of the commingled waste. The molten polyolefin components of the commingled waste form an immiscible phase separate from the ester solvent phase containing dissolved and suspended polyamides. The separate polyolefin phase can be easily separated from the ester solvent phase.

DETAILED DESCRIPTION

Polyolefins, particularly polypropylene, have been unexpectedly found to be immiscible in ester solvent compositions containing a cyclic ester and dissolved Nylon 6 and Nylon 6,6 polyamides at temperatures above the melting temperature of the polyolefin. Nylon 6 or Nylon 6,6 can be dissolved from commingled polyamide polymer and polyolefin polymer waste by ester solvent compositions containing cyclic esters, at temperatures above the melting temperature of polypropylene or other polyolefins. An immiscible viscous liquid polyolefin phase floats on the ester composition containing dissolved Nylon 6 or Nylon 6,6 polyamide polymer. Thus, entrainment of Nylon-bearing solvent in the polyolefin phase is virtually eliminated and the polyolefin can be removed from the process and recovered as a substantially ester-free and polyamide-free material without substantial filtration and washing cost. The process is preferably conducted at ambient pressure, so the selection of esters is limited to those that have high boiling temperatures. Nylon 6 or Nylon 6,6 recovered by the process of the present invention may be utilized in place of or blended with virgin polyamides in any known polyamide applications including extruding the melted material to form fiber which may be dyed.

The preferred ester solvent composition is ethylene carbonate, propylene carbonate, butylene carbonate, or mixtures thereof. These cyclic esters are environmentally benign and exhibit relatively low acute toxicity, as well as low chronic toxicity.

In a preferred practice of the invention, commingled fibers composed of polyamide and polypropylene are separated into polyamide polymer and polypropylene polymer by admixing the fibers with propylene carbonate in sufficient quantity to suspend the fibers. The admixture is heated to a temperature above about 165 degrees Celsius at ambient pressure whereupon the polypropylene fibers melt and form an immiscible phase separate from the ester composition phase containing dissolved and suspended polyamide polymer. The polyamide polymer is not significantly degraded even upon heating to a temperature near the melting temperature of the polyamide polymer. Higher temperatures offer advantages in that more of the polyamide polymer is dissolved thus promoting the coalescence of polypropylene into a separate phase, and in that the viscosity of the molten polypropylene decreases with temperature, once again promoting the coalescence of the polypropylene into a separate phase floating on the surface of the propylene carbonate phase. Upon cooling of the solution, polyamide precipitates as small discrete particles suspended within the polypropylene carbonate phase, but the polypropylene polymer phase solidifies into a solid mass which can then be easily separated from the polyamide polymer suspended in propylene carbonate. Ethylene carbonate or butylene carbonate can be substituted for propylene carbonate in this preferred practice of the present invention.

Copending patent application Ser. No. 10/708,479 (Mauldin) discloses that polyester polymer is decomposed when heated in the presence of a cyclic ester such as propylene carbonate. The cyclic ester admixed with polyester polymer decomposition products is taught to have utility as an industrial solvent. This novel solvent composition has been found to be suitable for the practice of the present invention.

The process of this invention can be advantageously and quite satisfactorily practiced with any carpet as the starting material, provided only that there are significant amounts of nylon fibers present. The nylon can be either of the types found most often in carpet, Nylon 6 (poly-6-aminocaproic acid) or Nylon 6,6 (poly-hexamethyleneadipamide).

In one preferred embodiment of the invention, the starting material is carpeting composed of Nylon face fibers with polyolefins only being present as components of the carpet backing which has been shredded, ground, and sifted to remove non-fibrous backing components. This starting material is admixed with propylene carbonate and heated to a temperature of at least about 165 degrees Celsius. The temperature must be appropriately selected based on the carpeting composition and operating parameters. Substantial dissolution of Nylon 6,6 requires a higher temperature than substantial Nylon 6 dissolution. Separation of polyolefins from the polyamide polymer present in the starting material does not require dissolution of all polyamide polymer present in the admixture or even a substantial quantity of the polyamide polymer present in the admixture. However, substantial amounts of polyamide fiber hinder the formation of a separate polyolefin phase. The amount of ester solvent composition present in the admixture and degree of dissolution of polyamide polymer should be sufficient to allow molten globules of polyolefin sufficient mobility to coalesce and form a separate phase. Undissolved polyamide fibers can be recovered from the ester phase along with dissolved polyamide polymer.

The most preferred practice of the present invention involves admixing commingled polyamide fibers and polypropylene fibers physically separated from post-consumer carpet waste with an ester solvent composition containing propylene carbonate and esters produced by the decomposition of Poly (ethylene terephthalate) when it is heated in the presence of propylene carbonate to a temperature of about 230 degrees Celsius. The economics of the process of the present invention are improved by employing recycled Poly(ethylene terephthalate) esters as a portion of the ester solvent composition. Nylon 6 or Nylon 6,6 dissolved or suspended in the ester solvent composition phase can be recovered by precipitation of dissolved material upon cooling, followed by filtration and washing.

The many advantages of the process of the present invention include the ability to separate Nylon polymers from polyolefin polymers using a safe, environmentally acceptable process to recover clean, relatively pure nylon polymers.

Further details regarding the invention are set forth in the non-limiting example which follows. EXAMPLE Propylene carbonate was added a large heated and stirred glass laboratory vessel and heated to a temperature of 200 degrees Celsius. Fibers recovered from post-residential carpet composed of Nylon 6 face fibers and polypropylene fibers from the backing structure were slowly added to the hot propylene such that 50 grams of carpet fibers were admixed with 1000 grams of propylene carbonate. All evidence of fibers disappeared from the propylene carbonate within about 3 minutes of completion of fiber addition, and viscous globules could be observed floating in the propylene carbonate. Approximately 80% of the propylene carbonate was drained from the flask, cooled to about 80 degrees C. A particulate was filtered from the cooled propylene carbonate. The propylene carbonate was returned to the flask and reheated to 220 degrees C. whereupon an additional 50 grams of the same carpet fibers were added along with additional propylene carbonate to maintain an approximate proportion of 50 grams carpet fibers to 1000 grams of propylene carbonate. The particulate precipitate filtered from the cooled propylene carbonate was washed with methanol and dried.

The above process was repeated until the volume of the viscous phase floating on the propylene carbonate phase was approximately 30% of the volume of the propylene carbonate phase, whereupon the entire contents of the flask were drained. The viscous phase cooled to form a hard mass which was identified as Polypropylene. The washed and dried precipitate from the cooled propylene carbonate phase was analyzed by Differential Scanning Calorimetry and found to have the characteristics of pure crystalline Nylon 6 polyamide polymer. Multiple batches of washed and dried precipitate were collected, mixed with an equal amount of virgin Nylon 6 polymer, melted and extruded into Nylon 6 fiber that exhibited the tenacity expected of pure virgin Nylon 6 fiber.

The present invention may be embodied in other specific forms without departing from the spirit or essential attributes thereof, and accordingly, reference should be made to the appended claims, rather than to the foregoing specification, as indicating the scope of the invention.

The invention claimed is:

1. A method for separating a polyolefin component from a polyamide component of a post-consumer or post-industrial commingled waste containing both polyolefin and polyamide polymeric components comprising:
   (a) admixing the commingled waste with an ester solvent composition, wherein the polyolefin is immiscible in the ester solvent composition;
   (b) heating the admixture to a temperature above the melting temperature of the polyolefin component sufficient to dissolve at least a portion of the polyamide component of the commingled waste in the ester solvent composition and form a separate immiscible molten polyolefin phase;
   (c) separating the ester solvent composition containing dissolved polyamide from the immiscible polyolefin phase.

2. The method of claim 1 wherein in step (a) the ester solvent composition comprises about 98% to about 30% by weight of the admixture.

3. The method of claim 1 wherein in step (a) the commingled waste is composed predominantly of Nylon 6 fibers commingled with polypropylene fibers.

4. The method of claim 1 wherein in step (a) the commingled waste is composed predominantly of Nylon 6,6 fibers commingled with polypropylene fibers.

5. The method of claim 4 wherein in step (b) the admixture is heated to a temperature above about 220 degrees Celsius to dissolve Nylon 6,6.

6. The method of claim 1, wherein in step (a) the ester solvent composition is predominantly ethylene carbonate, propylene carbonate, butylene carbonate, or combinations thereof.

7. The method of claim 1 wherein in step (a) the ester solvent composition is predominantly propylene carbonate.

8. The method of claim 1 wherein in step (a) the ester solvent composition contains a cyclic ester and decomposition products of poly(ethylene terephthalate) formed by heating poly(ethylene terephthalate) in the presence of a cyclic ester to a temperature above about 215 degrees Celsius.

9. The method of claim 8 wherein the ester solvent composition contains propylene carbonate and decomposition products of poly(ethylene terephthalate) formed by heating poly(ethylene terephthalate) in the presence of propylene carbonate to a temperature above about 215 degrees Celsius.

10. The method of claim 1 wherein in step (b) the ester solvent composition contains dissolved polyamide polymer and suspended undissolved polyamide polymer separate from the immiscible molten polyolefin phase.

11. A method for separating the Nylon 6 polymer component from the polyolefin polymer component of commingled post-consumer carpet waste containing at least polyolefin and Nylon 6 polyamide fibers comprising: (a) admixing the commingled carpet waste with an ester solvent composition containing at least one cyclic ester; (b) heating the admixture to a temperature above about 190 degrees Celsius for a period of at least about 5 minutes to dissolve at least a portion of the Nylon 6 fibers in the ester solvent composition and form a separate discrete molten polyolefin phase; and (c) separating the discrete molten polyolefin phase from the ester solvent composition phase by skimming, filtration, centrifugation, or combinations thereof.

12. The method of claim 11 wherein in step (a) the ester solvent composition containing at least one cyclic ester is predominantly propylene carbonate, ethylene carbonate, butylene carbonate or mixtures thereof.

13. The method of claim 11 wherein in step (b) the admixture is heated to a temperature above about 200 degrees Celsius.

14. The method of claim 11 wherein in step (a) the commingled carpet waste constitutes between 2% and 50% by weight of the admixture.

15. The method of claim 11 wherein the post-consumer carpet waste containing polyolefin and Nylon 6 polyamide fibers contains polypropylene fibers derived from the carpet backing structure.

16. The method of claim 15 wherein the post-consumer carpet waste containing polyolefin and Nylon 6 fibers denotes the fibrous components of a pre-processed waste which process comprises physically sorting post-consumer waste to obtain a sorted carpet waste composed exclusively of carpet pieces containing only Nylon 6 face fibers, then separating the fibrous components of the sorted carpet waste from dirt and non-fibrous carpet backing components by shredding, cutting, grinding, washing, screening, air elutriation, particle size separation techniques, and combinations thereof.

17. A method for separating a Nylon 6,6 polyamide polymer component from a polyolefin polymer component of commingled post-consumer carpet waste containing at least polyolefin and Nylon 6,6 fibers comprising: (a) admixing the commingled carpet waste with an ester solvent composition containing at least one cyclic ester; (b) heating the admixture to a temperature above about 215 degrees Celsius for a period of at least about 5 minutes to dissolve at least a portion of the Nylon 6,6 fibers in the ester solvent composition and form a separate discrete molten polyolefin phase; and (c) separating the discrete molten polyolefin phase from the ester solvent composition phase by skimming, filtration, centrifugation, or combinations thereof.

18. The method of claim 17 wherein in step (a) the ester solvent composition is predominantly propylene carbonate, ethylene carbonate, butylene carbonate or mixtures thereof.

19. The method of claim 17 wherein in step (b) the admixture is held at a temperature above about 215 degrees Celsius for a period of at least about 15 minutes.

20. The method of claim 17 wherein the post-consumer carpet waste containing polyolefin and Nylon 6,6 polyamide fibers contains polypropylene fibers derived from the carpet backing structure.

21. The method of claim 20 wherein the post-consumer carpet waste containing polyolefin and Nylon 6,6 fibers denotes the fibrous component of a pre-processed waste which process comprises physically sorting post-consumer waste to obtain a sorted carpet waste composed exclusively of carpet pieces containing only Nylon 6,6 face fibers, separating the fibrous component of the sorted carpet waste from at least some dirt and non-fibrous carpet backing components by shredding, cutting, grinding, washing, screening, air elutriation, particle size separation techniques, and combinations thereof.

22. The method of claim 17 wherein in step (a) the ester solvent composition is propylene carbonate.

23. The method of claim 1 wherein in step (c) the ester solvent composition containing dissolved polyamide and the immiscible polyolefin phase are cooled prior to separation to form an ester composition containing suspended polyamide and a separate solid polyolefin mass.

24. A method for separating a polyolefin component from a nylon component of a commingled polymer composition comprising:
   (a) admixing the commingled polymer composition with an ester solvent composition comprising at least one cyclic ester, wherein the polyolefin is immiscible in the ester solvent composition;
   (b) heating the admixture to a temperature above the melting temperature of the polyolefin component sufficient to dissolve at least a portion of the nylon component of the commingled polymer composition in the ester solvent composition and to form a separate immiscible molten polyolefin phase; and
   (c) separating the ester solvent composition containing dissolved nylon from the immiscible polyolefin phase.

25. The method of claim 24, wherein the ester solvent composition comprises about 98% to about 30% by weight of the admixture.

26. The method of claim 24, wherein the commingled polymer composition comprises at least one of Nylon 6, Nylon 6,6, propylene and mixtures thereof.

27. The method of claim 24, wherein the admixture is heated to a temperature above about 220 degrees Celsius.

28. The method of claim 24, wherein the ester solvent composition comprises ethylene carbonate, propylene carbonate, butylene carbonate, or combinations thereof.

29. The method of claim 24, wherein the cyclic ester solvent composition is predominantly propylene carbonate.

30. The method of claim 24, wherein the ester solvent composition comprises decomposition products of poly(ethylene terephthalate).

31. The method of claim 24, wherein the ester solvent composition contains dissolved nylon polymer and suspended undissolved nylon polymer separate from the immiscible molten polyolefin mass.

32. A method for separating a Nylon 6 polymer component from a polyolefin polymer component of commingled polymer composition comprising:
   (a) admixing the commingled polymer composition with a carbonate ester solvent composition;
   (b) heating the admixture to a temperature above about 190 degrees Celsius to dissolve at least a portion of the Nylon 6 polymer component in the carbonate ester solvent composition and form a separate discrete molten polyolefin phase; and
   (c) separating the discrete molten polyolefin phase from the carbonate ester solvent composition phase.

33. The method of claim 32 wherein the admixture is heated to a temperature above about 200 degrees Celsius.

34. The method of claim 32, wherein the commingled polymer composition comprises between 2% and 50% by weight of the admixture.

35. The method of claim 32, wherein the commingled polymer composition comprises polypropylene.

36. The method of claim 32, wherein the carbonate ester solvent comprises propylene carbonate, ethylene carbonate, butylene carbonate or combinations thereof.

37. The method of claim 33, wherein the commingled polymer composition comprises carpet.

38. A method for separating a Nylon 6,6 polyamide component from a polyolefin polymer component of commingled polymer composition comprising:

(a) admixing the commingled polymer composition with a carbonate ester solvent composition to form an admixture;

(b) heating the admixture to a temperature above about 215 degrees Celsius to dissolve at least a portion of the Nylon 6,6 fibers in the carbonate ester solvent composition and to form a separate discrete molten polyolefin phase; and (c) separating the discrete molten polyolefin phase from the carbonate ester solvent composition.

39. The method of claim 1, wherein the polyamide component is one or more nylons.

40. The method of claim 10, wherein the polyamide component is one or more nylons.

* * * * *